(No Model.)
E. L. TOY.
CUSHION TIRE.
No. 600,185. Patented Mar. 8, 1898.
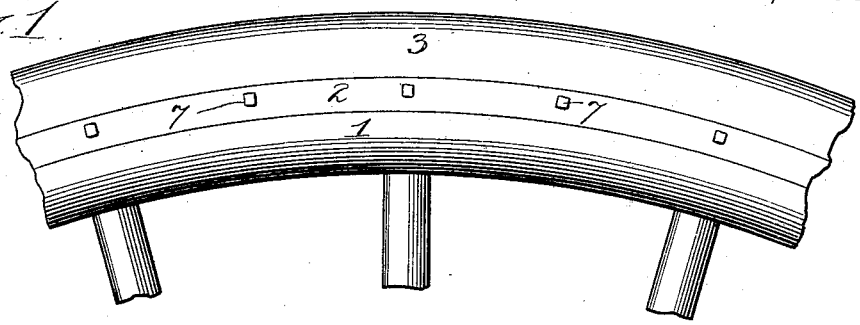
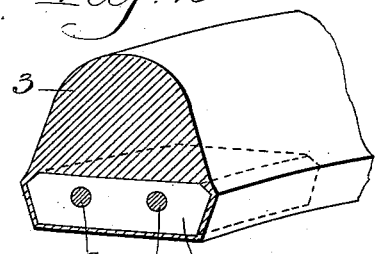
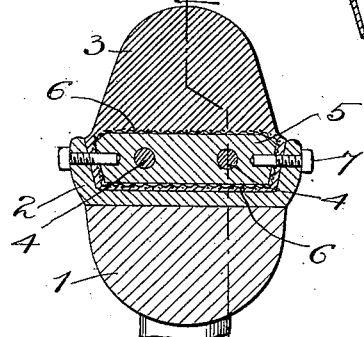
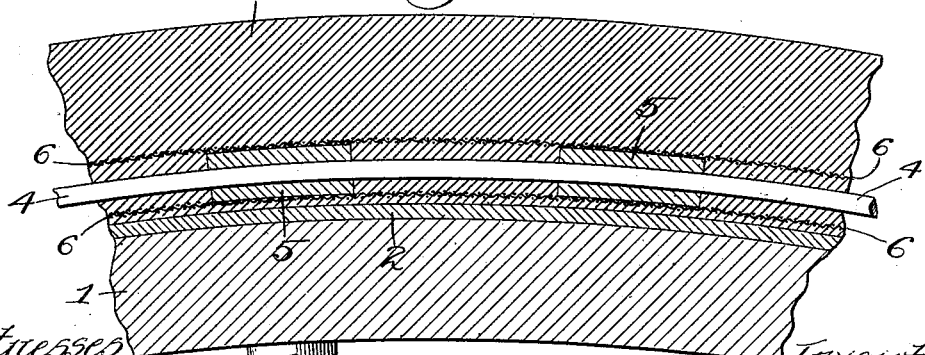
Witnesses
Wm. J. Henning
Wm. M. Rheem
Inventor
Elias L. Toy
by Dwight B. Cheever
Atty.

UNITED STATES PATENT OFFICE.

ELIAS L. TOY, OF AKRON, OHIO, ASSIGNOR TO THE WHITMAN & BARNES MANUFACTURING COMPANY, OF SAME PLACE.

CUSHION-TIRE.

SPECIFICATION forming part of Letters Patent No. 600,185, dated March 8, 1898.

Application filed November 30, 1897. Serial No. 660,204. (No model.)

*To all whom it may concern:*

Be it known that I, ELIAS L. TOY, a citizen of the United States, residing at Akron, in the county of Summit and State of Ohio, have invented certain new and useful Improvements in Cushion-Tires; and I hereby declare the following to be a full, clear, and exact description of my invention in its best form now known to me, reference being had to the accompanying drawings, which form a part of this specification.

The object of my invention is to produce a cushion-tire adapted to use on vehicles which, while of simple construction, shall be substantial and durable, which will avoid the tendency of the retaining-wires to cut the elastic material and the tendency of the elastic material to creep in its channel, and which will be securely held in place on the wheel-rim and can be easily attached and detached.

In the drawings, Figure 1 is a side view of the tire attached to the rim of the wheel. Fig. 2 shows the tire separated from the wheel. Fig. 3 is a transverse sectional view of the tire and wheel-rim. Fig. 4 is a longitudinal sectional view on the line $a\ b$ of Fig. 3.

1 is the felly of the wheel, to which is securely fastened the channel 2, in which rests the tire 3, fastened in place by the longitudinal wires 4. In tires fastened by such wires as heretofore made there is a tendency of the elastic body to creep or slide in its channel under the strain encountered in traveling, causing them to wear out rapidly. There is also a tendency of the wires to cut the elastic material, either destroying it or loosening their grip upon it. I avoid these evils by constructing the tire with blocks 5 of wood or metal (having holes through them for the wires) embedded in the rubber or other elastic material. In addition to the support given by the wires I prefer to fasten the tire to the rim by the screws 7, passing through the edges of these channels into these blocks, or by bolts passing entirely through the blocks and channel. The tire may be reinforced by having strips of cotton fabric along the tire above and below the blocks, as shown, and by having the rubber in the base between the blocks vulcanized, so that the blocks, rubber, and fabric in the base become practically one composite tire, while the tread portion of the tire remains soft and elastic.

Having described my invention, what I claim, and desire to secure by Letters Patent, is—

1. In a cushion-tire, the combination of an elastic portion, a series of blocks embedded in the base of said elastic portion, reinforcing fabric in said elastic portion about said blocks, and means for securing said tire to the rim of a wheel, substantially as described.

2. In a cushion-tire, the combination of an elastic portion, a series of blocks embedded in the base of said elastic portion, and one or more wires extending around the base of said tire through said blocks and elastic portion adapted to fasten said tire to the rim of a wheel, substantially as described.

3. The combination of a wheel-felly having a recess adapted to receive a tire, a tire embedded therein, blocks embedded in said tire, reinforcing fabric about said blocks and screws or bolts passing through the edge of said felly into said blocks, substantially as described.

4. The combination of the felly, the channel, the elastic tire in said channel, the blocks embedded in said tire, one or more wires passing through said blocks adapted to fasten said tire to said channel, and screws or bolts through the edges of said channels entering the blocks, whereby the tire is secured in the channel and fortified against creeping and cutting, substantially as described.

ELIAS L. TOY.

Witnesses:
R. P. DOLSON,
GEO. W. BILLOW.